(12) United States Patent
Inoue et al.

(10) Patent No.: US 7,847,483 B2
(45) Date of Patent: Dec. 7, 2010

(54) GLASS COMPOSITION AND DISPLAY PANEL USING SAME

(75) Inventors: Osamu Inoue, Osaka (JP); Shinya Hasegawa, Osaka (JP); Miyuki Nakai, Osaka (JP); Tsutomu Koshizuka, Osaka (JP)

(73) Assignee: Panasonic Corporation, Osaka (JP)

( * ) Notice: Subject to any disclaimer, the term of this patent is extended or adjusted under 35 U.S.C. 154(b) by 255 days.

(21) Appl. No.: 12/066,149

(22) PCT Filed: Sep. 1, 2006

(86) PCT No.: PCT/JP2006/317310

§ 371 (c)(1),
(2), (4) Date: Mar. 7, 2008

(87) PCT Pub. No.: WO2007/029608

PCT Pub. Date: Mar. 15, 2007

(65) Prior Publication Data

US 2009/0102379 A1  Apr. 23, 2009

(30) Foreign Application Priority Data

Sep. 7, 2005 (JP) ............................. 2005-258788
Sep. 29, 2005 (JP) ............................. 2005-283385

(51) Int. Cl.
*H01J 5/00* (2006.01)
*C03C 8/10* (2006.01)
*H01J 1/22* (2006.01)
*C03C 8/14* (2006.01)

(52) U.S. Cl. .................... 313/582; 313/587; 501/11; 501/14; 501/15

(58) Field of Classification Search .......... 313/581–587
See application file for complete search history.

(56) References Cited

U.S. PATENT DOCUMENTS 6,413,894 B1 * 7/2002 Sato ............................. 501/77

(Continued)

FOREIGN PATENT DOCUMENTS

JP  9-278482 A  10/1997

(Continued)

OTHER PUBLICATIONS

Morita et al., Japanese Patent Application 2000-313635_machine translation.*

*Primary Examiner*—Sikha Roy
*Assistant Examiner*—Tracie Green
(74) *Attorney, Agent, or Firm*—Hamre, Schumann, Mueller & Larson, P.C.

(57) ABSTRACT

Disclosed is a glass composition composed of an oxide glass wherein the percentages of constitutional elements other than oxygen (O) expressed in atomic % are as follows: boron (B) is not less than 56% and not more than 72%; silicon (Si) is not less than 0% and not more than 15%; Zinc (Zn) is not less than 0% and not more than 18%; potassium (K) is not less than 8% and not more than 20%; and the total of K, sodium (Na) and lithium (Li) is not less than 12% and not more than 20%. This glass composition further may contain at least one of magnesium (Mg), calcium (Ca), strontium (Sr) and barium (Ba) in an amount of more than 0% and not more than 5%, and molybdenum (Mo) and/or tungsten (W) in an amount of more than 0% and not more than 3%.

12 Claims, 4 Drawing Sheets

U.S. PATENT DOCUMENTS 6,475,605 B2 * 11/2002 Hayakawa et al. .......... 428/210
6,599,851 B1 * 7/2003 Ryu ............................ 501/22

FOREIGN PATENT DOCUMENTS

| | | | |
|---|---|---|---|
| JP | 2000-313635 A | 11/2000 |
| JP | 2001-139345 A | 5/2001 |
| JP | 2001-146436 A | 5/2001 |
| JP | 2001-172046 A | 6/2001 |
| JP | 2002-274883 A | 9/2002 |
| JP | 2004-035297 A | 2/2004 |

* cited by examiner

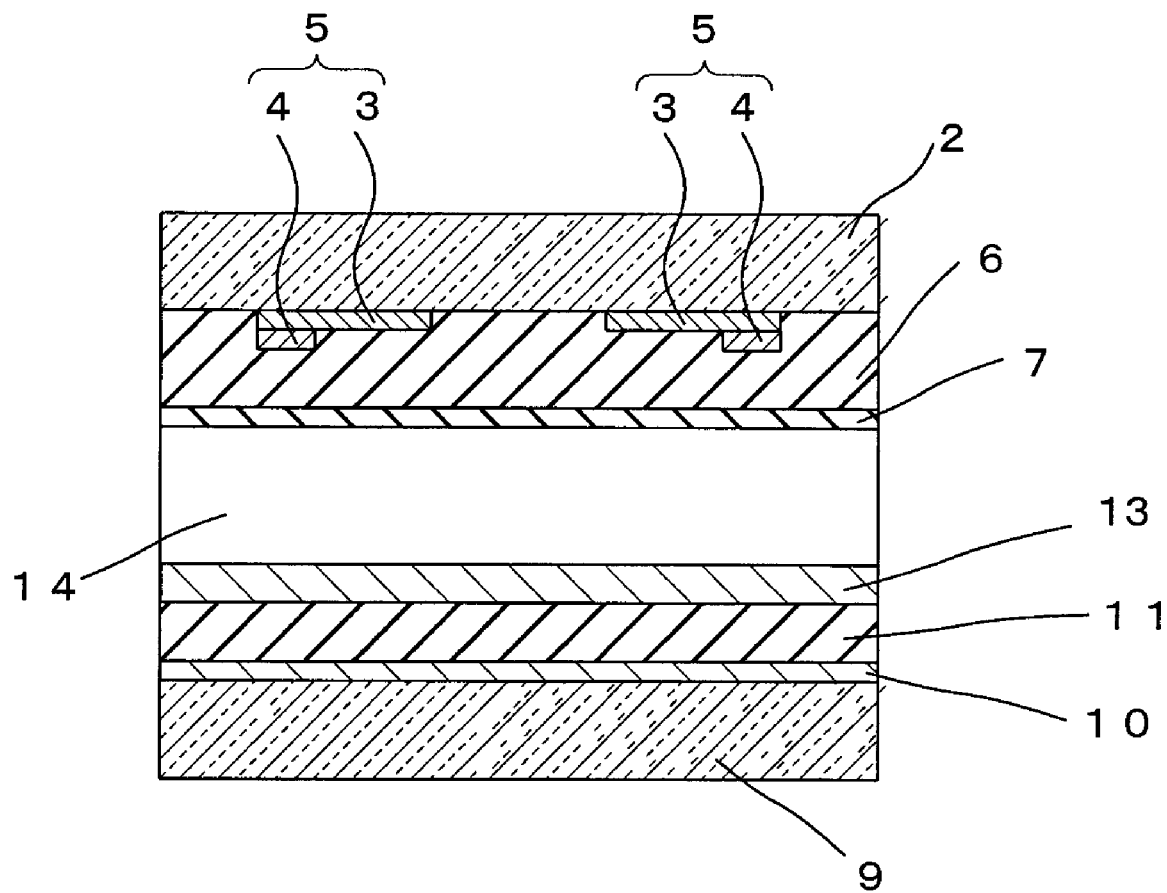
F I G. 2

GLASS COMPOSITION AND DISPLAY PANEL USING SAME

TECHNICAL FIELD

The present invention relates to a glass composition suitable for covering electrodes, and to display panels, particularly plasma display panels, using such glass compositions.

BACKGROUND ART

In display devices and integrated circuits such as plasma display panels ("PDPs" hereinafter), field emission displays, liquid crystal display devices, fluorescent display devices, multilayer ceramic devices, and hybrid integrated circuits, a substrate is used in which electrodes and wires formed of Ag, Cu, or the like are formed on a substrate surface. In certain cases, these electrodes and wires are covered with insulating glass materials for protection. This is described below by taking a PDP as a representative example of display device.

Generally, a PDP has a configuration in which a pair of electrodes is arranged in an orderly manner respectively on opposing two glass substrates, and gases that mainly contain inert gases such as Ne and Xe are confined therebetween. Application of a voltage between the electrodes causes a discharge to occur in each tiny cell in the vicinity of the electrodes, causing the cell to emit light for display. For protection, the electrodes are covered with an insulating glass material called a dielectric layer.

For example, in a PDP of an AC type, the glass substrate serving as a front panel has transparent electrodes formed thereon, and metal electrodes having lower resistivity, such as Ag, Cu, and Al are formed on the transparent electrodes. These composite electrodes are covered with a dielectric layer, on which is formed a protective layer (MgO layer).

Generally, glass with a low softening point is used for the dielectric layer that covers the electrodes. The dielectric layer is formed by applying a glass powder-containing paste to cover the electrodes using a method such as a screen printing method or a die coating method, followed by baking.

The following lists some of the properties required for the glass composition forming the dielectric layer.

(1) Insulation to allow it to be formed on the electrodes.

(2) A thermal expansion coefficient that does not differ greatly from that of the substrate material, so that warping of the glass substrate and peeling or cracking of the dielectric layer can be prevented in a large-area panel.

(3) When used for the front panel, amorphous glass with high visible light transmissivity so that the light given off by the phosphors can be efficiently used as display light.

(4) A low softening point to match the heat resistance of the substrate glass.

An example of the glass substrate used for PDPs is soda lime glass that is produced by a float process and generally readily available as window sheet glass. Another example is high distortion point glass that has been developed for PDPs. Such glass generally has a heat resistance up to 600° C. and a thermal expansion coefficient of $75 \times 10^{-7}$ to $85 \times 10^{-7}/°$ C.

Thus, for requirement (2), a thermal expansion coefficient of approximately $70 \times 10^{-7}$ to $90 \times 10^{-7}/°$ C. is desirable. As to requirement (4), because the glass paste needs to be baked at temperatures no greater than 600° C., which is the distortion point of the glass substrate, the softening point needs to be at most 595° C., desirably at most about 590° C., so that the glass paste can soften sufficiently even when baked at or below 600° C.

At present, $PbO$—$SiO_2$ glass whose main raw material is PbO is used mainly as the glass material satisfying these requirements.

However, with consideration given to recent environmental problems, there is a demand for a dielectric layer that is free from Pb. There is also a need to lower the dielectric constant of the glass material to reduce power consumption of the PDP. As such Pb-free glass, a $Bi_2O_3$—$B_2O_3$—$ZnO$—$SiO_2$ glass material has been proposed that uses zinc borate as a main component and that includes Bi instead of Pb to attain a low softening point (for instance, see JP2001-139345A), for example. However, as in the case of the Pb materials, the Bi materials also have the problem of a high relative dielectric constant, roughly ranging from 9 to 13. Currently, there is a need for materials with a distinctly lower dielectric constant compared with these materials, specifically, materials with a relative dielectric constant of 7 or less, more desirably 6 or less.

In this connection, to achieve a low dielectric constant and a low softening point at the same time, there have been proposed materials with a relative dielectric constant of 7.0 or less using zinc borate glass that contains alkali metals instead of Pb (for instance, see JP9 (1997)-278482A, JP2000-313635A, and JP2002-274883A).

However, in the conventionally studied alkali zinc borate glass, the relative dielectric constant can be reduced to only 6.4 at best. Further, while it is possible to satisfy a low softening point, a suitable thermal expansion coefficient, and a low dielectric constant at the same time, it has been difficult to realize glass that has a high glass transition temperature (glass transition point) along with these properties.

If the glass simply is required to cover the electrodes, glass with a low softening point, a suitable thermal expansion coefficient, and a low dielectric constant would be sufficient. However, in PDPs, the glass layer is reheated to a temperature close to 500° C. in the post-processes of electrode covering, such as annealing of the MgO layer and the sealing process in which the front panel and the back panel are joined together. The softening point of the glass for the dielectric layer is slightly below 600° C., and as such application of heat about 500° C. does not soften the glass. However, when the applied heat greatly exceeds the glass transition temperature, the thermal expansion coefficient increases abruptly. In a large-area display in particular, this causes the dielectric layer to peel off from the substrate or cracks the dielectric layer, impairing insulation and reliability. According to studies made by the inventors of the present invention, a reheat treatment of about 500° C. requires the glass to have a glass transition temperature of desirably 465° C. or greater, more desirably 480° C. or greater. Display devices other than PDP, and circuit boards and the like are also at risk of the same kind of problem, when the high-temperature heat treatment is performed again after covering the electrodes and wires with the glass materials.

Studies by the inventors of the present invention have found that the boron content needs to be increased and the zinc content needs to be reduced to achieve a low dielectric constant in alkali zinc borate glass. While the glass transition temperature tends to be small in such composition range, there is completely no regard for the glass transition temperature in conventional glass for covering electrodes. Accordingly, materials with a high glass transition temperature along with a low softening point, a low dielectric constant, and a suitable thermal expansion coefficient have not been made yet.

DISCLOSURE OF THE INVENTION

The present invention is intended to provide a glass composition and a display panel using the same. The glass composition has a low softening point, a low dielectric constant, a thermal expansion coefficient that well matches that of a substrate to be used for a display panel, and a high glass transition temperature. Furthermore, the glass composition allows a highly reliable display panel to be produced.

A glass composition of the present invention is oxide glass. In the glass composition, percentages of constituting elements excluding oxygen (O) are 56 atomic % to 72 atomic % boron (B), 0 atomic % to 15 atomic % silicon (Si), 0 atomic % to 18 atomic % zinc (Zn), 8 atomic % to 20 atomic % potassium (K), and 12 atomic % to 20 atomic % a total number of potassium (K), sodium (Na), and lithium (Li), all inclusive. In this specification, the "percentages of constituting elements excluding oxygen (O)" refers to the proportions of the respective constituting elements with respect to the total content, 100 atomic %, of the all elements excluding oxygen (O). This also applies to the percentages of elements (atomic percentages) used below.

According to the present invention, a glass composition can be provided that has a low softening point, a low dielectric constant, a thermal expansion coefficient that well matches that of a substrate and a high glass transition temperature, and makes it possible to produce a highly reliable display panel.

The invention also provides a display panel using a glass composition of the present invention.

A first display panel of the present invention includes a dielectric layer that contains the above-mentioned glass composition of the present invention and covers an electrode.

A second display panel of the present invention is a plasma display panel that includes: a front panel provided with a first electrode; a back panel provided with a second electrode crossing the first electrode, and disposed face to face with the front panel; a dielectric layer for covering at least one selected from the first electrode and the second electrode; and barrier ribs disposed between the front panel and the back panel to form discharge spaces, wherein at least one selected from the dielectric layer and the barrier ribs includes the above-mentioned glass composition of the present invention.

A third display panel of the present invention includes a first dielectric layer disposed on a substrate, an electrode disposed on the first dielectric layer, and a second dielectric layer disposed on the electrode, wherein the first dielectric layer includes the above-mentioned glass composition of the present invention.

With the first to third display panels of the present invention, a highly reliable display panel can be provided.

BRIEF DESCRIPTION OF DRAWINGS

FIG. 2 is a cross-sectional view of the PDP shown in FIG. 1.

BEST MODE FOR CARRYING OUT THE INVENTION

Figure 1:
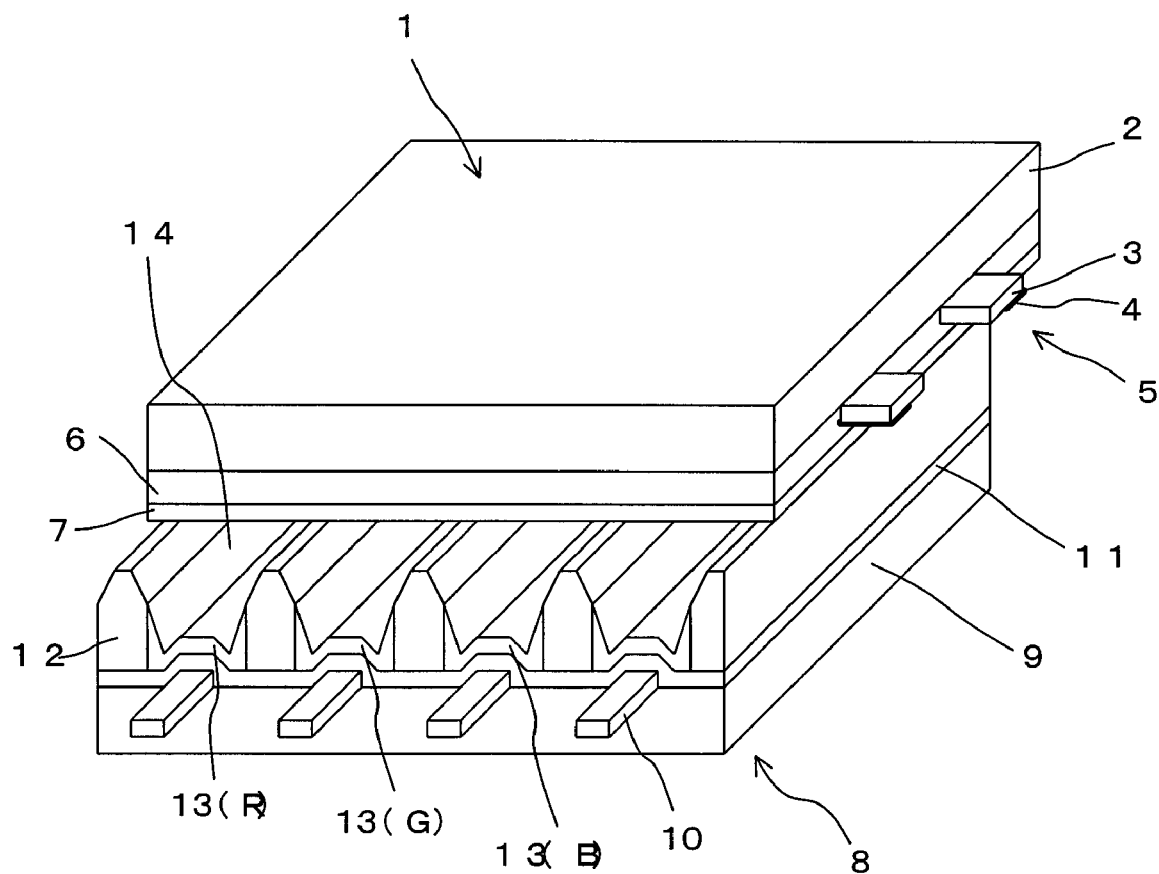
FIG. 1 is a partially cutaway, perspective view showing an exemplary configuration of a PDP according to the present invention.

After detailed study, the inventors of the present invention found that, with the foregoing composition ranges, a glass composition can be obtained that overcomes the drawbacks of the conventional zinc borate glass containing alkali metals, and that has a sufficiently high glass transition temperature, a low softening point, and a thermal expansion coefficient that well matches that of the substrate, while providing a sufficiently low dielectric constant.

The present invention can provide a glass composition having a softening point of 595° C. or less, a glass transition temperature of 465° C. or greater, a thermal expansion coefficient of $70 \times 10^{-7}/°$ C. to $90 \times 10^{-7}/°$ C., and a relative dielectric constant of 7 or less. By limiting the Zn amount, the relative dielectric constant can be reduced to 6 or less.

Preferably, a glass composition of the present invention further includes at least one selected from magnesium (Mg), calcium (Ca), strontium (Sr), and barium (Ba) in the amount of greater than 0 atomic % to no greater than 5 atomic %, in terms of the percentages of constituting elements excluding oxygen (O). In this way, the glass transition temperature can be increased further.

Alkali-containing glass with a low dielectric constant such as a glass composition of the present invention contains alkali metal components. As such, when the glass is used as the dielectric material for protecting the electrodes and the like containing Ag or Cu, a phenomenon known as "yellowing" may occur depending on baking or other conditions, in which Ag or Cu is oxidized to be ionized, and the resulting metal ions diffuse into the glass to be reduced again and deposit in the form of colloidal metals, causing the dielectric layer or glass substrate to appear yellow. Yellowing impairs display performance especially in applications where the glass is used as the dielectric layer for the front panel of PDPs.

With a glass composition of the present invention, yellowing can be prevented by inclusion of at least one selected from molybdenum (Mo) and tungsten (W) in the amount of greater than 0 atomic % and no greater than 3 atomic %.

The following will describe the role of each component and the reason for limiting its content in a glass composition of the present invention.

Boron (B) is a main component of a glass composition of the present invention. When B is contained in large amounts, both dielectric constant and softening point become small. However, there is also an accompanying decrease in glass transition temperature. The reason the B amount is limited to 56 atomic % or greater and no greater than 72 atomic % is that it is difficult to lower the dielectric constant with smaller amounts of B and that the glass transition temperature becomes too low with larger amounts of B.

Silicon (Si) is not an essential component of a glass composition of the present invention. Inclusion of Si lowers the dielectric constant and improves the chemical durability of the glass. However, while it raises the softening point, an accompanying increase of the glass transition temperature is not as large as the increase of the softening point. For this reason, Si may be used in suitable amounts to obtain a lower dielectric constant or improve chemical durability (for example, water resistance, etc.). However, using large amounts of Si is not preferable, because the dielectric constant can be lowered more effectively with B, and Zn and alkali metals (Mg, Ca, Sr, Ba) have greater effects of improving chemical durability. The reason for limiting the Si amount to no greater than 15 atomic % is that use of Si above this range lowers the glass transition temperature or overly increases the softening point, even when the softening point is suitably adjusted with other components. As noted above, as long as the amount of Zn, Ca, or the like is not 0, a desirable range of Si amount is no greater than 12 atomic %, more desirably no greater than 10 atomic %.

Zinc (Zn) is not an essential component of a glass composition of the present invention. Inclusion of Zn increases both dielectric constant and softening point. The glass transition temperature is also increased. Zn also improves chemical durability. It is therefore desirable to use suitable amounts of Zn for the purpose of increasing the glass transition temperature or improving chemical durability. The reason for limiting the Zn amount to no greater than 18 atomic % is that Zn overly increases the dielectric constant above this range. To achieve a relative dielectric constant of 6 or less, the Zn amount should desirably be 7 atomic % or less.

As is B, potassium (K) is a main component of a glass composition of the present invention. Inclusion of K increases thermal expansion coefficient, lowers softening point, and increases glass transition temperature. The dielectric constant is increased as well. Some of the K component may be replaced with Na or Li of the same alkali metal family. However, the use of Na or Li lowers thermal expansion coefficient more than K. The reason K is used in 8 atomic % or greater and no greater than 20 atomic % and that the total amount of alkali metals (Li, Na, K) is 12 atomic % or greater and no greater than 20 atomic % is that the softening point rises and the thermal expansion coefficient becomes overly small below these ranges, and that the glass transition temperature lowers and the thermal expansion coefficient becomes too large above these ranges.

Alkali glass has stronger adhesion to the substrate glass than other types of glass, and as such a thermal expansion coefficient of $70 \times 10^{-7}/°C.$ to $80 \times 10^{-7}/°C.$, lower than that conventionally thought to be necessary, may be sufficient. For this reason, in a glass composition of the present invention, the total amount of K, Na, and Li is desirably no greater than 15 atomic %.

Neither of Mg, Ca, Sr, and Ba is an essential component. However, addition of these components greatly increases the glass transition temperature without causing a large change in softening point. These elements are almost essential, particularly when a glass transition temperature of 480° C. or greater and a relative dielectric constant of less than 6.5 are to be realized at the same time. The reason the amount of these components is no greater than 5 atomic % is that the dielectric constant overly increases when the amount of these components is too large. Further, addition of these elements has the effect of improving chemical durability of the glass, when it deteriorates in the composition range containing large amounts of B and small amounts of Zn. Given the same amount, the glass transition temperature can be increased most effectively with Ca, followed in order by Sr, Ba, and Mg. The dielectric constant can be increased most effectively with Ba, followed in order by Sr, Ca, and Mg. Ca has the greatest improving effect of chemical durability, and Sr comes next. Taken together, Ca is most preferable, followed in order by Sr and Mg, and Ba is least preferable.

Mo and W are not essential components. However, addition of these elements reduces yellowing, which may occur when the glass is used as the material for covering the electrodes containing Ag or the like. The reason the amount of these elements is no greater than 3 atomic % is that distinct effects cannot be obtained when the amount is too small, and that the color imparted by the inclusion of these elements becomes too noticeable when the amount is too large.

To this date, the mechanism by which addition of Mo and W reduces yellowing has not been fully elucidated. However, it is conceivable that these metals serve as a stabilizer for Ag and Cu ions. Presumably, Mo and W turn into $MoO_4^{2-}$ and $WO_4^{2-}$ in the glass and bind to $Ag^+$ or $Cu^{2+}$ that are generated by heating and have diffused into the glass, thereby stabilizing $Ag^+$ and $Cu^{2+}$ and preventing these metal ions from being reduced and depositing as metal colloids.

A glass composition of the present invention includes the foregoing components, and typically is composed of substantially only the foregoing components (in other words, may be substantially free from components other than the foregoing components). However, a glass composition of the present invention also may include other components as long as the effects of the present invention are obtained. The total content of such other components is preferably no greater than 5 atomic %, more preferably no greater than 3 atomic %, and even more preferably no greater than 1 atomic %.

Specific examples of the other components include antimony (Sb), phosphorus (P), bismuth (Bi), and the like. Addition of these components lowers the glass transition temperature by about 10 to 20° C., and also lowers the softening point by about the same amount. Thus, these components can lower the glass transition temperature and softening point when the base composition has a high glass transition temperature and a high softening point. However, depending on the amount added, these components may cause problems such as increased dielectric constant, coloring of the glass, and increased raw material cost. It is therefore desirable that these components be added in suitably selected amounts.

Other than the foregoing components, small amounts of aluminum (Al), titanium (Ti), zirconium (Zr), lanthanum (La), cerium (Ce), yttrium (Y), manganese (Mn), niobium (Nb), tantalum (Ta), tellurium (Te), silver (Ag), copper (Cu), vanadium (V), and the like may be added for the purposes of, for example, adjusting thermal expansion coefficient, stabilizing glass, and improving chemical durability.

Preferably, a glass composition of the present invention is substantially free from lead (Pb). In this specification, "substantially free from" is intended to encompass inclusion of very small trace amounts of lead in terms of the percentages of constituting elements excluding oxygen (O), provided that it cannot be readily removed industrially and does not affect the characteristics of the glass. Specifically, the Pb content is no greater than 1 atomic %, preferably less than 0.1 atomic %.

In this specification, the percentages of constituting elements denote only the percentages of cations. However, since the glass composition of the present invention is oxide glass, it contains oxygen as anions. Following the convention, the foregoing cations can be given in units of oxides that are usually used as $B_2O_3$, $SiO_2$, $ZnO$, $K_2O$, $Na_2O$, $Li_2O$, $MgO$, $CaO$, $SrO$, $BaO$, $MoO_3$, and $WO_3$. It should be noted that this representation does not limit the valency of each cation in the glass.

Generally, glass compositions are represented by the weight percentages of such oxides. Further, since alkali metals (Li, Na, K) or alkaline earth metals (Mg, Ca, Sr, Ba) have similar contributions to the glass characteristics, these elements are often regarded as being at least one of different kinds of alkali metals or alkaline earth metals. However, since there is a large difference in atomic weight, for example, between Li and K and between Mg and Ba, when composition percentages are represented by weight percentages of elements, similar effects will result with a smaller weight in the case of Li and Mg and a larger weight in the case of K and Ba.

As a result, each of the composition percentages will extend over a very wide range. The present discussion avoids this by representing the percentage of each element in atomic %.

The composition range in which the content of more than one component is represented in atomic % cannot be converted to a composition range in weight %. However, for sake of explanation, the following describes a case where an exemplary composition range of a glass composition of the present invention is approximated to weight % of oxides.

For example, in order to obtain a relative dielectric constant of 6 or less, the Zn content desirably should be 7 atomic % or less. In this case, the ZnO content is no greater than 14 weight %, which sets a lower limit of 46 weight % for $B_2O_3$, a lower limit of 9 weight % for $K_2O$, and a lower limit of 11 weight % for the total number of $K_2O$, $Na_2O$, and $Li_2O$.

Further, in order to obtain a thermal expansion coefficient of $70 \times 10^{-7}/°C$. to $80 \times 10^{-7}/°C$., the total amount of K, Na, and Li desirably should be 15 atomic % or less. In this case, the upper limit of the total number of $K_2O$, $Na_2O$, and $Li_2O$ is 17 weight %, which sets an upper limit of less than 64 weight % for $B_2O_3$, and an upper limit of less than 33 weight % for ZnO.

As to $SiO_2$, the content is desirably less than 20 weight %, more desirably less than 16 weight %.

In sum, the most desirable composition ranges can be approximated to weight % of oxides as follows: 46 weight % or greater to less than 64 weight % $B_2O_3$; 0 weight % or greater to less than 16 weight % $SiO_2$; 0 weight % or greater to no greater than 14 weight % ZnO; 8 weight % or greater to no greater than 17 weight % $K_2O$; 10 weight % or greater to no greater than 17 weight % the total number of $K_2O$, $Na_2O$, and $Li_2O$; and greater than 0 weight % to no greater than 17 weight % for at least one selected from MgO, CaO, SrO, and BaO. Note that, these composition ranges merely represent an example of composition ranges, approximated to weight % of oxides, which provide particularly desirable characteristics in a glass composition of the present invention, and they do not limit the composition ranges of a glass composition of the present invention.

A glass composition of the present invention includes alkali metal components, and therefore, when used as the dielectric material for protecting Ag or Cu, yellowing may occur depending on baking or other conditions. As mentioned above, yellowing can be suppressed to some extent by adding Mo or W. However, depending on baking conditions, it may not be possible to fully suppress yellowing. When yellowing occurs, display performance is impaired in applications where the glass is used as the dielectric layer for the front panel of PDPs, for example. In such a case, a low dielectric constant can be maintained as a whole and yellowing can be prevented when a glass composition having a relatively high relative dielectric constant, substantially free from alkali metal is used for a first dielectric layer that is in direct contact with the electrodes (directly covering the electrodes), and when a glass composition of the present invention having a relatively low relative dielectric constant is used for a second dielectric layer.

The following will describe a PDP as a specific example of a display panel of the present invention. FIG. 1 is a partially cutaway, perspective view showing the main configuration of the PDP according to the present embodiment. FIG. 2 is a cross-sectional view of the PDP shown in FIG. 1. This PDP is of an AC surface discharge type, and has the same configuration as that of a conventional PDP except that a dielectric layer is formed from the foregoing glass composition.

The PDP is configured with a front panel 1 and a back panel 8 that are bonded to each other. The front panel 1 is provided with a front glass substrate 2, display electrodes (first electrodes) 5, a dielectric layer 6 that covers the display electrodes 5, and a dielectric-protecting layer 7 formed of magnesium oxide on the dielectric layer 6. Each of the display electrodes 5 is formed of a transparent conductive film 3 and a bus electrode 4 formed on the inner surface (the surface facing discharge spaces 14) of the front glass substrate 2. In order to provide good conductivity for the transparent conductive film 3 made of ITO or tin oxide, the display electrodes 5 have a layer of bus electrode 4 made of Ag or the like.

The back panel 8 includes a back glass substrate 9, address electrodes (second electrodes) 10 formed on one side of the back glass substrate 9, a dielectric layer 11 formed to cover the address electrodes 10, barrier ribs 12 provided on the upper surface of the dielectric layer 11, and phosphor layers, each of which is formed between the barrier ribs 12. The phosphor layers 13 include a red phosphor layer 13(R), a green phosphor layer 13(G), and a blue phosphor layer 13(B), which are arranged in this order.

Figure 4:
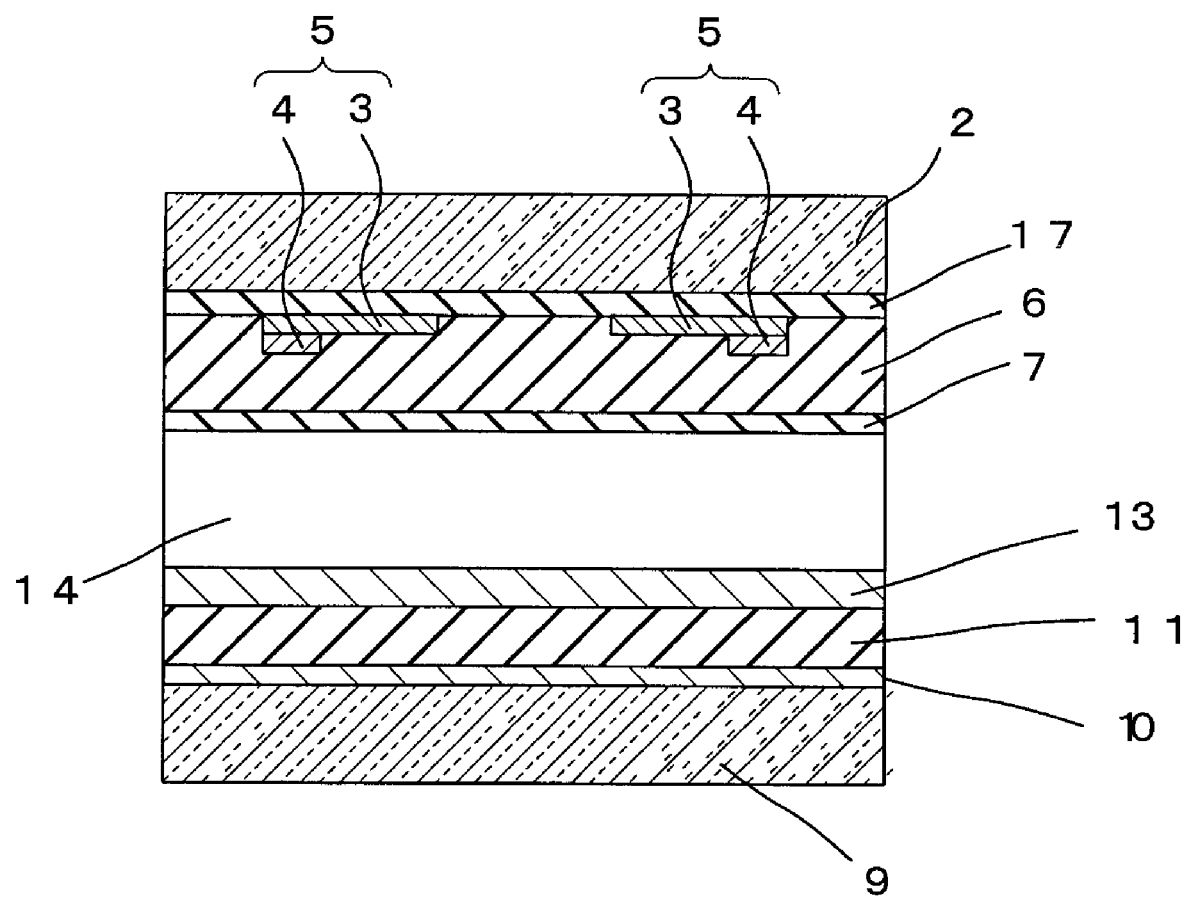
FIG. 4 is a cross-sectional view showing yet another exemplary configuration of the PDP according to the present invention.

A glass composition according to the present invention is used for the dielectric layer 6 and/or the dielectric layer 11, preferably the dielectric layer 6. A glass composition of the present invention also may be used for the barrier ribs 12. Transparency is required for the dielectric layer 6, but not for the dielectric layer 11 and the barrier ribs 12. Thus, in the case where a glass composition of the present invention is used for the dielectric layer 11 or the barrier ribs 12, a glass composition of the present invention may include $SiO_2$ or the like with a lower dielectric constant, dispersed therein as a filler. The influence of the dielectric constant of the substrate glass can be reduced when, as shown in FIG. 4, a dielectric layer 17 including a glass composition of the present invention is formed between the glass substrate 2 and the display electrodes 5, or between the glass substrate 9 and the address electrodes 10. In the example shown in FIG. 4, the dielectric layer 17 is provided between the glass substrate 2 and the display electrodes 5, and the members (films) that are identical to those of the PDP shown in FIG. 1 are indicated with the same numerals. Further, in the configuration shown in FIG. 4 (the dielectric layer interposed between the substrate and the electrodes), the dielectric layer 17 corresponds to the first dielectric layer, and the dielectric layer 6 corresponds to the second dielectric layer.

As an example, the following describes the case where a glass composition of the present invention is used for the dielectric layer 6. However, a glass composition of the present invention, with its low dielectric constant, low softening point, high glass transition temperature, and suitable thermal expansion coefficient, also can be used suitably for the dielectric layer 11, the barrier ribs 12, or the dielectric layer interposed between the substrate and the electrodes.

The phosphors that form the phosphor layers may be, for example, $BaMgAl_{10}O_{17}$:Eu for the blue phosphors, $Zn_2SiO_4$:Mn for the green phosphors, and $Y_2O_3$:Eu for the red phosphors.

The front panel 1 and the back panel 8 are arranged so that the respective display electrodes 5 and the respective address electrodes 10 are orthogonal to each other in the longitudinal direction thereof and the display electrodes 5 and the address electrodes 10 oppose each other. The front panel 1 and the back panel 8 are joined to each other using a sealing member (not shown).

The discharge spaces 14 are filled with a discharge gas (a filler gas) composed of rare gas components such as He, Xe, Ne, etc., under a pressure of approximately 66.5 to 79.8 kPa (500 to 600 Torr).

The display electrodes 5 and the address electrodes 10 each are connected to an external drive circuit (not shown). The voltage that is applied from the drive circuit allows electric discharge to occur in the discharge spaces 14. Ultraviolet rays with a short wavelength (a wavelength of 147 nm) that are generated by the electric discharge excite the phosphor layers 13 and thereby visible light is emitted.

Generally, the dielectric layer 6 is formed by applying a glass paste onto the electrodes formed on the glass substrate and baking it. The glass paste generally is obtained by adding a binder, a solvent, etc., which are used for providing printability, to a glass powder.

The glass paste includes a glass powder, a solvent, and resin (a binder). The glass paste additionally may include various kinds of additives for different purposes. Examples of such additional components include a surfactant, a development accelerator, an adhesive auxiliary, an antihalation agent, a preservation stabilizer, an antifoaming agent, an antioxidant, an ultraviolet absorber, pigments, dye and the like.

The resin (a binder) included in the glass paste is not particularly limited as long as it has low reactivity to low-melting glass powder. From the viewpoints of chemical stability, cost, safety, etc., examples of the resin include: cellulose derivatives, such as nitrocellulose, methyl cellulose, ethyl cellulose, and carboxymethyl cellulose; polyvinyl alcohol; polyvinyl butyral; polyethylene glycol; carbonate resin; urethane resin; acryl resin; melamine resin, etc.

The solvent to be contained in the glass paste is not particularly limited as long as it has low reactivity to the glass powder. From the viewpoints of, for example, chemical stability, cost and safety, as well as the view point of compatibility with the binder resin, a suitable organic solvent may be selected and the organic solvents so selected may be used either individually or in combination of two or more kinds. Specific examples of such organic solvents include: ethylene glycol monoalkyl ethers; ethylene glycol monoalkyl ether acetates; diethylene glycol dialkyl ethers; propylene glycol monoalkyl ethers; propylene glycol dialkyl ethers; propylene glycol alkyl ether acetates; esters of aliphatic carboxylic acids; alcohols such as terpineol and benzyl alcohol; and the like.

The dielectric layer 6 using a glass composition of the present invention is typically formed by a method in which a glass paste is applied by a screen method or with a bar coater, a roll coater, a die coater, a doctor blade, etc. and then is baked. However, the method is not limited thereto. For example, the dielectric layer 6 also can be formed by a method of attaching and baking a sheet containing the glass composition.

Preferably, the dielectric layer 6 has a thickness of approximately 10 μm to 50 μm so as to attain both insulation and optical transparency.

Figure 3:
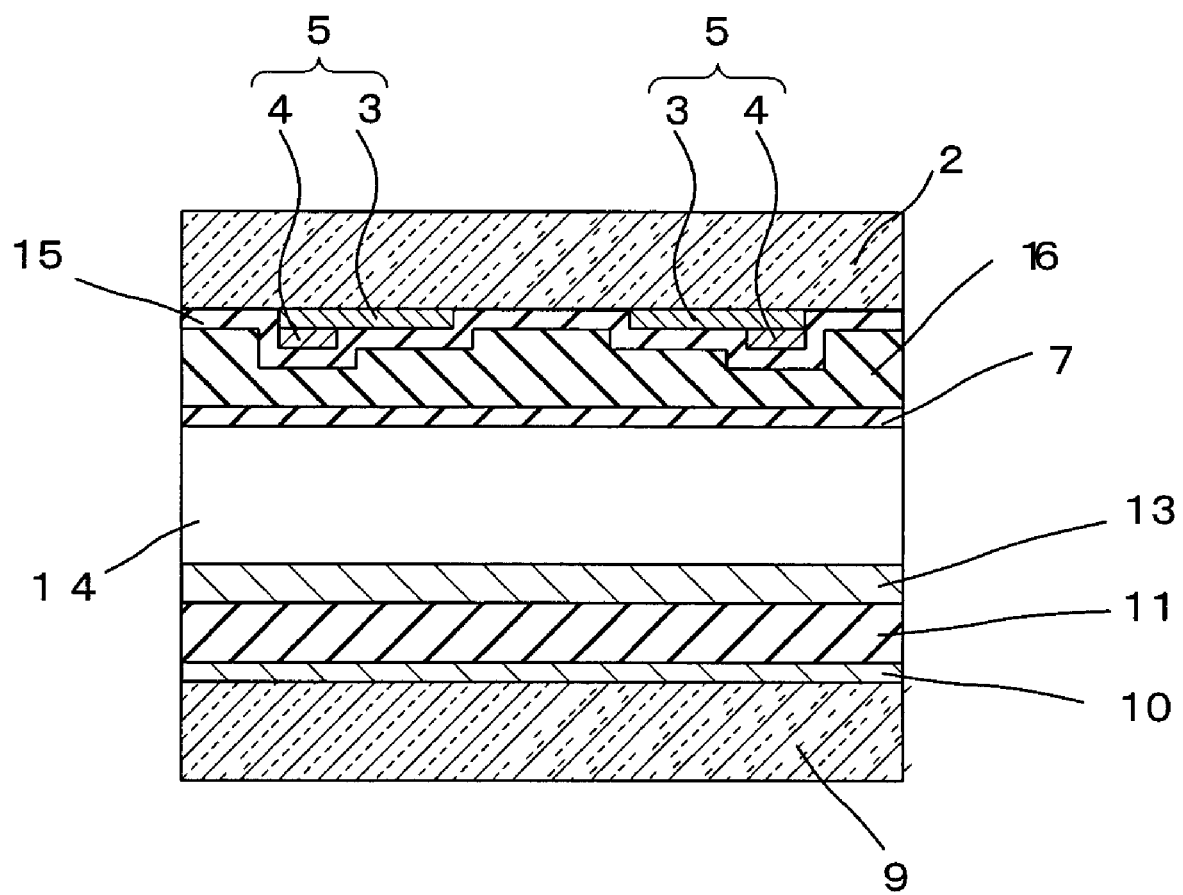
FIG. 3 is a cross-sectional view showing another exemplary configuration of the PDP according to the present invention.

Next, a PDP is described in which the dielectric layer has a two-layer structure as shown in FIG. 3. The PDP shown in FIG. 3 has the same configuration as that of the PDP shown in FIG. 2 except that the dielectric layer of a two-layer structure including a first dielectric layer 15 and a second dielectric layer 16 is provided instead of the dielectric layer 6. The members (films) that are identical to those of the PDP shown in FIG. 2 are indicated with the same numerals, and the descriptions thereof are not repeated.

As shown in FIG. 3, the first dielectric layer 15 and the second dielectric layer 16 are arranged so that the first dielectric layer 15 covers the display electrodes 5 while the second dielectric layer 16 covers the first dielectric layer 15.

When the dielectric layer has the two-layer structure as described above, it is preferable that the glass composition included in the second dielectric layer 16 be a glass composition of the present invention, and that the glass composition included in the first dielectric layer 15 be a glass composition that is substantially free from alkali metal. Since the first dielectric layer 15 in direct contact with the electrodes is substantially free from alkali metal, at least the first dielectric layer 15 can be prevented from yellowing and from having a decreased withstand voltage due to deposition of Ag or Cu colloids. Furthermore, since the first dielectric layer 15 prevents Ag or Cu ions from diffusing, the second dielectric layer 16 also can be prevented from discoloring or from having a decreased withstand voltage.

The present invention can provide a glass composition having a relative dielectric constant of 7 or less, or 6 or less. When this glass composition is used for the second dielectric layer 16, the dielectric constant of the dielectric layer can be reduced as a whole even when glass having a relatively large dielectric constant is used for the first dielectric layer 15. Considering that the relative dielectric constant of the conventional Pb glass or Bi glass is 9 to 13, power consumption also can be reduced with the foregoing two-layer configuration.

Such a dielectric layer having a two-layer structure can be formed by forming the first dielectric layer 15 and then applying thereon a glass composition for the second dielectric layer and then baking it. In this case, it is preferable that the glass composition to be used for the first dielectric layer 15 have a higher softening point than that of the glass composition to be contained in the second dielectric layer 16.

In order to ensure the insulation between the electrodes 3, 4 and the second dielectric layer 16, and the prevention of interface reactions between the electrodes 3, 4 and the second dielectric layer 16, it is preferable that the thickness of the first dielectric layer 16 be at least 1 μm.

Preferably, the total thickness of the first dielectric layer 15 and the second dielectric layer 16 is approximately 10 μm to 50 μm in order to attain both insulation and transmissivity.

An example of a method of producing the PDP panel is described below. First, the front panel is formed. Transparent electrodes (transparent conductive film) are formed in the form of a plurality of lines on one principal plane of a flat front glass substrate. Subsequently, a silver paste is applied onto the transparent electrodes, and the whole front glass substrate is heated to bake the silver paste and form bus electrodes. As a result, the display electrodes are formed that are composed of the transparent conductive film and the bus electrodes.

A glass paste (in this embodiment, a glass paste including a glass composition of the present invention) for the dielectric layer of a PDP of the present invention is applied by the blade coater method onto the principal plane of the front glass substrate so as to cover the display electrodes. Thereafter, the whole front glass substrate is kept at 90° C. for 30 minutes to dry the glass paste. This is followed by baking at a temperature of about 580° C. for 10 minutes to form the dielectric layer.

Magnesium oxide (MgO) is deposited on the dielectric layer by the electron-beam vapor deposition method, followed by baking to form a protective layer. The baking temperature is about 500° C.

The method of producing the PDP whose dielectric layer has a two-layer structure as shown in FIG. 3 is as follows. As above, a glass paste for the first dielectric layer is applied to cover the display electrodes and then is dried and baked.

Thereafter, a glass paste (in this embodiment, a glass paste including a glass composition of the present invention) for the second dielectric layer is applied to cover the first dielectric layer formed as above. This is followed by drying and baking to form the second dielectric layer.

Next, a back panel is formed. A silver paste is applied to one principal surface of a flat back glass substrate in the form of a plurality of lines. Thereafter, the whole back glass substrate is heated to bake the silver paste. As a result, address electrodes are formed.

Subsequently, a glass paste is applied between adjacent address electrodes. The whole back glass substrate then is heated to bake the glass paste. As a result, barrier ribs are formed.

Next, phosphor ink of each color, R, G, or B is applied between adjacent barrier ribs. The back glass substrate then is heated to approximately 500° C. to bake the phosphor ink and thereby remove a resin component (a binder) and the like contained in the phosphor ink. As a result, phosphor layers are formed.

Thereafter, the front panel and the back panel are bonded to each other using sealing glass. The temperature for this process is about 500° C. Thereafter, the internal spaces thus sealed are evacuated to a high vacuum and then are charged with rare gas. As a result, a PDP is obtained.

The PDP and the method of producing it that are described above are examples and the present invention is not limited thereto. As described above, the dielectric layer is subjected, though briefly, to the heat treatment of about 500° C. for the baking of the MgO layer and the sealing of the front and back panels, in addition to the brief baking of the dielectric layer itself. As such, if the glass transition temperature of the dielectric layer is too low, the thermal expansion coefficient increases in a temperature range above the glass transition temperature. This causes cracking or peeling of the dielectric layer, making the dielectric layer useless. According to the assessment by the inventors of the present invention, the glass transition temperature of the glass composition contained in the dielectric layer is desirably 465° C. or greater, more desirably 480° C. or greater.

A PDP of a surface discharge type such as the one described above is a typical example of the PDP to which the present invention is applied. However, the PDP to which the present invention is applied is not limited thereto. The present invention is also applicable to those of an opposed discharge type. Furthermore, the PDP to which the present invention is applied is not limited to those of the AC type. The present invention is also applicable to a PDP that is provided with a dielectric layer even if it is of a DC type.

A glass composition of the present invention is not limited for use in PDPs, but can be used effectively for display panels that require an additional high-temperature heat treatment of about 500° C. following the heat treatment that is performed to form the glass layer.

A glass composition of the present invention is suited for display panels in which the electrodes covered with the dielectric layer include at least one selected from Ag and Cu. The electrodes may contain Ag as a main component.

EXAMPLES

Hereafter, the present invention is described further in detail using examples.

Example 1

As starting raw materials, oxides or carbonates of various metals rated as special grade or higher were used. The raw materials were weighed and sufficiently mixed together so that the respective atomic ratios indicated in Table 1 were obtained. Then, the raw materials thus mixed together were placed in a platinum crucible and melted in an electric furnace at a temperature of 900 to 1100° C. for two hours. Thereafter, the melt thus obtained was cooled rapidly by being pressed with a brass plate and glass cullet was produced. The glass cullet was crushed into particles with an average particle diameter of about 2 to 3 μm, and a provisional glass transition temperature Tg* and a softening point Ts were measured with a macro differential thermal analyzer (Rigaku Corporation, model TG8110).

Then, the glass cullet was remelted and sent to a mold. The glass melt then was annealed for 30 minutes at a temperature 40° C. above the provisional glass transition temperature Tg*, and was allowed to cool gradually to obtain a glass block. From the glass block, a rod measuring 4 mm×4 mm×20 mm was obtained by cutting, and a glass transition temperature Tg and a thermal expansion coefficient α between 30 to 300° C. were measured using a thermomechanical analyzer (Rigaku Corporation, model TMA8310). An about 1 mm-thick plate measuring 20 mm×20 mm was also obtained from the glass block, and the surfaces thereof were mirror-polished and gold electrodes were vapor-deposited thereon. The capacitance was measured at a frequency of 1 kHz using an impedance analyzer 4294A of Agilent Technologies, and a relative dielectric constant was determined from the area and thickness of the sample.

The results of measurement are shown in Table 1. In Tables below, the glass transition temperature Tg and softening point Ts are in degrees Celsius, and the unit of thermal expansion coefficient α is ×10$^{-7}$/° C.

TABLE 1

| | Composition Ratio (Atomic %) | | | | | | Properties | | | | Example |
|---|---|---|---|---|---|---|---|---|---|---|---|
| Sample No. | B | Si | Zn | Li | Na | K | Tg | Ts | α | ε | Comparative Example |
| 1 | 50 | 10 | 24 | | | 16 | 485 | 586 | 77 | 7.4 | Comparative Example |
| 2 | 54 | 10 | 20 | | | 16 | 480 | 584 | 78 | 7.3 | Comparative Example |
| 3 | 55 | 10 | 19 | | | 16 | 475 | 583 | 79 | 7.2 | Comparative Example |
| 4 | 56 | 10 | 18 | | | 16 | 473 | 578 | 81 | 7.0 | Example |
| 5 | 58 | 10 | 16 | | | 16 | 472 | 575 | 81 | 6.7 | Example |
| 6 | 60 | 10 | 14 | | | 16 | 471 | 571 | 82 | 6.5 | Example |
| 7 | 66 | 9 | 9 | | | 16 | 468 | 567 | 82 | 6.1 | Example |
| 8 | 70 | 7 | 7 | | | 16 | 467 | 562 | 83 | 5.9 | Example |
| 9 | 72 | 6 | 6 | | | 16 | 465 | 560 | 83 | 5.9 | Example |
| 10 | 74 | 5 | 5 | | | 16 | 461 | 558 | 84 | 5.8 | Comparative Example |

TABLE 1-continued

| Sample No. | Composition Ratio (Atomic %) | | | | | | Properties | | | | Example |
|---|---|---|---|---|---|---|---|---|---|---|---|
| | B | Si | Zn | Li | Na | K | Tg | Ts | α | ε | Comparative Example |
| 11 | 80 | 2 | 2 | | | 16 | 455 | 552 | 85 | 5.6 | Comparative Example |
| 12 | 66 | 0 | 20 | | | 14 | 473 | 561 | 78 | 7.2 | Comparative Example |
| 13 | 66 | 2 | 18 | | | 14 | 470 | 563 | 78 | 6.9 | Example |
| 14 | 66 | 15 | 5 | | | 14 | 466 | 577 | 79 | 5.6 | Example |
| 15 | 66 | 16 | 4 | | | 14 | 463 | 578 | 79 | 5.5 | Comparative Example |
| 16 | 66 | 20 | 0 | | | 14 | 457 | 582 | 79 | 5.2 | Comparative Example |
| 17 | 66 | 10 | 16 | | | 8 | 495 | 612 | 65 | 6.6 | Comparative Example |
| 18 | 66 | 10 | 14 | | | 10 | 480 | 588 | 68 | 6.5 | Comparative Example |
| 19 | 66 | 10 | 12 | | | 12 | 479 | 576 | 74 | 6.3 | Example |
| 20 | 66 | 8 | 8 | | | 18 | 472 | 561 | 85 | 6.1 | Example |
| 21 | 66 | 7 | 7 | | | 20 | 470 | 556 | 88 | 5.9 | Example |
| 22 | 66 | 6 | 6 | | | 22 | 454 | 551 | 91 | 5.9 | Comparative Example |
| 23 | 66 | 10 | 12 | | 12 | | 471 | 570 | 64 | 6.4 | Comparative Example |
| 24 | 66 | 10 | 12 | 12 | | | 465 | 563 | 60 | 6.5 | Comparative Example |
| 25 | 66 | 7 | 7 | | 20 | | 452 | 546 | 69 | 6.0 | Comparative Example |
| 26 | 66 | 7 | 7 | 20 | | | 440 | 545 | 62 | 6.0 | Comparative Example |
| 27 | 66 | 10 | 12 | | 4 | 8 | 470 | 574 | 72 | 6.3 | Example |
| 28 | 66 | 10 | 12 | 4 | | 8 | 467 | 572 | 70 | 6.4 | Example |
| 29 | 66 | 7 | 7 | | 12 | 8 | 467 | 560 | 76 | 5.9 | Example |
| 30 | 66 | 7 | 7 | 12 | | 8 | 465 | 553 | 72 | 6.0 | Example |
| 31 | 66 | 7 | 7 | | 6 | 14 | 470 | 563 | 82 | 5.9 | Example |
| 32 | 66 | 7 | 7 | 6 | | 14 | 468 | 560 | 80 | 5.9 | Example |

As clearly shown in Table 1, in sample numbers 1 to 11 with increasing the amount of B, decreasing the total amount of Si and Zn, and the amount of K fixed at 16 atomic %, the relative dielectric constant ∈ became smaller with the increasing amounts of B. In sample numbers 1 to 6, only the amount of Zn was varied and the amount of Si was held constant because the softening point Ts becomes too high when Si is at or above 10 atomic % in the small amount of B. The relative dielectric constant ∈ was 7.0 or less when B was 56 atomic % or greater, and ∈ was 6.5 or less when B was 60 atomic %. However, the glass transition temperature Tg also became smaller with the increasing amounts of B. The glass transition temperature Tg was less than 465° C. when the amount of B exceeded 72 atomic %. It therefore was confirmed that a desirable range of B was 56 atomic % or greater to no greater than 72 atomic %.

In sample numbers 12 to 16 with varying amounts of Zn and B, and the amounts of B and K fixed at 66 atomic % and 14 atomic % respectively, the relative dielectric constant ∈ became smaller with decreasing amounts of Zn and increasing amounts of Si. The glass transition temperature Tg also became smaller. It therefore was confirmed that the amount of Zn needs to be no greater than 18 atomic %, and the amount of Si needs to be no greater than 15 atomic %. A more desirable range of Si amount was confirmed to be no greater than 12 atomic %.

In sample numbers 17 to 22 with decreasing amounts of K and the amount of B fixed at 66 atomic %, smaller amounts of K tended to yield smaller values of thermal expansion coefficient α and larger values of softening point Ts. When the amount of K was too large, the thermal expansion coefficient α became too high and the glass transition temperature Tg was decreased. This confirmed that a desirable amount of K was 12 atomic % or greater to no greater than 20 atomic %.

In sample numbers 23 to 26 in which the alkali metals Na and Li were used instead of K, the thermal expansion coefficient α became too low. Increasing the amount of Na or Li was found to be undesirable since it lowered the glass transition temperature Tg. However, in sample numbers 27 to 32 in which Na and Li were used together with K, desirable characteristics were obtained by increasing the total amount of alkali metal element with the addition of Na or Li to the K content (K=8 atomic %), which alone could not provide desirable characteristics.

It also was confirmed that ∈ could be reduced to 6.0 or less when the amount of Zn was 7 atomic % or less in particular.

Further, when the total amount of alkali metal element (Na, Li, K) was 15 atomic % or less within the ranges of this Example, the thermal expansion coefficient could be reduced to $80 \times 10^{-7}$/° C. or less.

The inventors of the present invention considered various other combinations of the foregoing composition ratios, and found that, in all cases, glass having desirable characteristics with a relative dielectric constant of 7 or less, a glass transition temperature of 465° C. or greater, a softening point of 590° C. or less, and a thermal expansion coefficient of $70 \times 10^{-7}$ to $90 \times 10^{-7}$/° C. could be obtained when the composition was adjusted within the ranges of B=56 to 72 atomic %, Si=0 to 15 atomic %, Zn=0 to 18 atomic %, K=8 to 20 atomic %, and K+ Na+ Li=12 to 20 atomic %. Further, when the amount of Zn was 7 atomic % or less, ∈ could be reduced to 6.0 or less. When the total amount of alkali metal element was 15 atomic % or less, the thermal expansion coefficient could be reduced to $80 \times 10^{-7}$/° C. or less.

Example 2

According to the same methods as in Example 1, glass cullet and glass rods were formed that had the atomic percentages of metal elements as shown in Table 2 (sample numbers 41 to 65). According to the same methods as in Example 1, measurements were made as to the glass transition temperature Tg, softening point Ts, thermal expansion coefficient α, and relative dielectric constant ∈. The results are shown in Table 2.

TABLE 2

| Sample No. | Composition Ratio (Atomic %) | | | | | | | | Properties | | | | |
|---|---|---|---|---|---|---|---|---|---|---|---|---|---|
| | B | Si | Zn | K | Mg | Ca | Sr | Ba | Tg | Ts | Ts – Tg | α | ε |
| 41 | 67.0 | 10.0 | 10.0 | 13.0 | | | | | 470 | 575 | 105 | 77 | 6.1 |
| 42 | 66.8 | 10.0 | 10.0 | 13.0 | 0.2 | | | | 472 | 576 | 104 | 77 | 6.1 |
| 43 | 66.3 | 9.9 | 9.9 | 12.9 | 1.0 | | | | 476 | 577 | 101 | 78 | 6.1 |
| 44 | 65.7 | 9.8 | 9.8 | 12.7 | 2.0 | | | | 479 | 581 | 102 | 79 | 6.2 |
| 45 | 65.0 | 9.7 | 9.7 | 12.6 | 3.0 | | | | 483 | 584 | 101 | 79 | 6.3 |
| 46 | 63.7 | 9.5 | 9.5 | 12.3 | 5.0 | | | | 490 | 590 | 100 | 80 | 6.4 |
| 47 | 62.3 | 9.3 | 9.3 | 12.1 | 7.0 | | | | 493 | 594 | 101 | 81 | 6.5 |
| 48 | 66.8 | 10.0 | 10.0 | 13.0 | | 0.2 | | | 474 | 577 | 103 | 78 | 6.1 |
| 49 | 66.3 | 9.9 | 9.9 | 12.9 | | 1.0 | | | 483 | 585 | 102 | 78 | 6.1 |
| 50 | 65.7 | 9.8 | 9.8 | 12.7 | | 2.0 | | | 489 | 588 | 99 | 79 | 6.3 |
| 51 | 65.0 | 9.7 | 9.7 | 12.6 | | 3.0 | | | 494 | 590 | 96 | 80 | 6.4 |
| 52 | 63.7 | 9.5 | 9.5 | 12.3 | | 5.0 | | | 499 | 593 | 94 | 81 | 6.6 |
| 53 | 62.3 | 9.3 | 9.3 | 12.1 | | 7.0 | | | 503 | 595 | 92 | 83 | 6.8 |
| 54 | 66.8 | 10.0 | 10.0 | 13.0 | | | 0.2 | | 473 | 576 | 103 | 78 | 6.2 |
| 55 | 66.3 | 9.9 | 9.9 | 12.9 | | | 1.0 | | 481 | 581 | 100 | 78 | 6.3 |
| 56 | 65.7 | 9.8 | 9.8 | 12.7 | | | 2.0 | | 486 | 584 | 98 | 79 | 6.4 |
| 57 | 65.0 | 9.7 | 9.7 | 12.6 | | | 3.0 | | 492 | 588 | 96 | 80 | 6.5 |
| 58 | 63.7 | 9.5 | 9.5 | 12.3 | | | 5.0 | | 496 | 591 | 95 | 82 | 6.7 |
| 59 | 62.3 | 9.3 | 9.3 | 12.1 | | | 7.0 | | 498 | 593 | 95 | 83 | 6.9 |
| 60 | 66.8 | 10.0 | 10.0 | 13.0 | | | | 0.2 | 472 | 576 | 104 | 78 | 6.2 |
| 61 | 66.3 | 9.9 | 9.9 | 12.9 | | | | 1.0 | 479 | 580 | 101 | 79 | 6.3 |
| 62 | 65.7 | 9.8 | 9.8 | 12.7 | | | | 2.0 | 484 | 582 | 98 | 80 | 6.5 |
| 63 | 65.0 | 9.7 | 9.7 | 12.6 | | | | 3.0 | 490 | 584 | 94 | 81 | 6.6 |
| 64 | 63.7 | 9.5 | 9.5 | 12.3 | | | | 5.0 | 495 | 588 | 93 | 84 | 6.8 |
| 65 | 62.3 | 9.3 | 9.3 | 12.1 | | | | 7.0 | 500 | 592 | 92 | 86 | 7.0 |

As clearly shown in Table 2, addition of alkaline earth metals (Mg, Ca, Sr, Ba) increased the glass transition temperature Tg (480° C. or greater) without greatly increasing the softening point Ts. However, since the addition of these elements increases both the relative dielectric constant ∈ and the softening point Ts, the alkaline earth metal (Mg, Ca, Sr, Ba) should preferably be added in the amount of no greater than 5 atomic %, more preferably no greater than 3 atomic %. By comparing these elements, the amount that is necessary to increase the glass transition temperature Tg to 480° C. or greater is the smallest in Ca. The addition of Ca causes the relative dielectric constant ∈ to increase only in a small increment. A study of simultaneously adding different kinds of alkaline earth metals found that this could yield average results. It was therefore possible to add more than one kind of alkaline earth metal element in a total amount of no greater than 5 atomic %.

Example 3

According to the same methods as in Example 1, glass cullet and glass rods were formed that had the atomic percentages of metal elements as shown in Table 3 (sample numbers 71 to 95). According to the same methods as in Example 1, measurements were made as to the glass transition temperature Tg, softening point Ts, thermal expansion coefficient α, and relative dielectric constant ∈. The results are shown in Table 3.

TABLE 3

| Sample No. | Composition Ratio (Atomic %) | | | | | | | | Properties | | | | |
|---|---|---|---|---|---|---|---|---|---|---|---|---|---|
| | B | Si | Zn | K | Mg | Ca | Sr | Ba | Tg | Ts | Ts – Tg | α | ε |
| 71 | 71.0 | 10.0 | 6.0 | 13.0 | | | | | 465 | 570 | 105 | 80 | 5.6 |
| 72 | 70.8 | 10.0 | 6.0 | 13.0 | 0.2 | | | | 466 | 570 | 104 | 80 | 5.6 |
| 73 | 70.3 | 9.9 | 5.9 | 12.9 | 1.0 | | | | 470 | 573 | 103 | 80 | 5.6 |
| 74 | 69.6 | 9.8 | 5.9 | 12.7 | 2.0 | | | | 476 | 578 | 102 | 79 | 5.7 |
| 75 | 68.9 | 9.7 | 5.8 | 12.6 | 3.0 | | | | 481 | 581 | 100 | 78 | 5.7 |
| 76 | 67.5 | 9.5 | 5.7 | 12.3 | 5.0 | | | | 491 | 591 | 100 | 79 | 5.8 |
| 77 | 66.0 | 9.3 | 5.6 | 12.1 | 7.0 | | | | 502 | 603 | 101 | 80 | 5.9 |
| 78 | 70.8 | 10.0 | 6.0 | 13.0 | | 0.2 | | | 467 | 569 | 102 | 80 | 5.6 |
| 79 | 70.3 | 9.9 | 5.9 | 12.9 | | 1.0 | | | 472 | 572 | 100 | 80 | 5.6 |
| 80 | 69.6 | 9.8 | 5.9 | 12.7 | | 2.0 | | | 480 | 578 | 98 | 79 | 5.7 |
| 81 | 68.9 | 9.7 | 5.8 | 12.6 | | 3.0 | | | 486 | 583 | 97 | 79 | 5.7 |
| 82 | 67.5 | 9.5 | 5.7 | 12.3 | | 5.0 | | | 498 | 592 | 94 | 80 | 5.8 |
| 83 | 66.0 | 9.3 | 5.6 | 12.1 | | 7.0 | | | 510 | 603 | 93 | 81 | 6.0 |
| 84 | 70.8 | 10.0 | 6.0 | 13.0 | | | 0.2 | | 466 | 569 | 103 | 80 | 5.6 |
| 85 | 70.3 | 9.9 | 5.9 | 12.9 | | | 1.0 | | 471 | 573 | 102 | 80 | 5.7 |
| 86 | 69.6 | 9.8 | 5.9 | 12.7 | | | 2.0 | | 477 | 576 | 99 | 80 | 5.7 |
| 87 | 68.9 | 9.7 | 5.8 | 12.6 | | | 3.0 | | 484 | 581 | 97 | 80 | 5.9 |
| 88 | 67.5 | 9.5 | 5.7 | 12.3 | | | 5.0 | | 495 | 591 | 96 | 80 | 6.0 |
| 89 | 66.0 | 9.3 | 5.6 | 12.1 | | | 7.0 | | 508 | 603 | 95 | 81 | 6.2 |
| 90 | 70.8 | 10.0 | 6.0 | 13.0 | | | | 0.2 | 466 | 569 | 103 | 80 | 5.6 |
| 91 | 70.3 | 9.9 | 5.9 | 12.9 | | | | 1.0 | 471 | 572 | 101 | 80 | 5.7 |

TABLE 3-continued

| Sample | Composition Ratio (Atomic %) | | | | | | | | Properties | | | | |
|---|---|---|---|---|---|---|---|---|---|---|---|---|---|
| No. | B | Si | Zn | K | Mg | Ca | Sr | Ba | Tg | Ts | Ts − Tg | α | ε |
| 92 | 69.6 | 9.8 | 5.9 | 12.7 | | | | 2.0 | 476 | 575 | 99 | 80 | 5.8 |
| 93 | 68.9 | 9.7 | 5.8 | 12.6 | | | | 3.0 | 482 | 577 | 95 | 80 | 6.0 |
| 94 | 67.5 | 9.5 | 5.7 | 12.3 | | | | 5.0 | 493 | 587 | 94 | 82 | 6.2 |
| 95 | 66.0 | 9.3 | 5.6 | 12.1 | | | | 7.0 | 506 | 600 | 94 | 84 | 6.4 |

As clearly shown in Table 3, addition of alkaline earth metals (Mg, Ca, Sr, Ba) increased the glass transition temperature Tg (480° C. or greater) without greatly increasing the softening point Ts. However, since the addition of these elements increases both the relative dielectric constant ∈ and the softening point Ts, the alkaline earth metal (Mg, Ca, Sr, Ba) preferably should be added in the amount of no greater than 5 atomic %, more preferably no greater than 3 atomic %. By comparing these elements, the amount that is necessary to increase the glass transition temperature Tg to 480° C. or greater is the smallest in Ca. The addition of Ca causes the relative dielectric constant ∈ to increase only in a small increment. Though not shown in this Example, the inventors of the present invention also studied the effects of adding the alkaline earth metals in composition systems having atomic percentages (B:Si:Zn:alkali metal) not used in this Example. As a result, the same or similar effects were obtained in all cases. Further, a study of simultaneously adding different kinds of alkaline earth metals found that this could yield average results. It was therefore possible to add more than one kind of alkaline earth metal element in a total amount of no greater than 5 atomic %.

Example 4

According to the same methods as in Example 1, glass cullet and glass rods were formed that had the atomic ratio of metal elements Si:Zn:K:Ca=10:9:13:1, and the atomic percentages of B, Mo, and W as shown in Table 4. According to the same methods as in Example 1, measurements were made as to the glass transition temperature Tg, softening point Ts, thermal expansion coefficient α, and relative dielectric constant ∈. In Table 4, the total of the components is not 100%, because the remaining part consists of Si, Zn, K, and Ca added in the foregoing atomic ratio.

Then, ethyl cellulose, used as resin, and α-terpineol, used as a solvent, were mixed and dispersed in the glass powder with three rollers, so as to prepare a glass paste.

Next, a substrate with an electrode pattern (electrode-equipped substrate) was prepared. A material of ITO (transparent electrodes) was applied in a predetermined pattern onto a surface of flat soda lime glass of about 2.8 mm thick and then was dried. Subsequently, a silver paste that was a mixture of silver powder and an organic vehicle was applied in the form of a plurality of lines. Thereafter, the whole substrate was heated to bake the silver paste and thereby form the electrode-equipped substrate.

The glass paste of each different glass composition prepared above was applied onto the electrode-equipped substrate by the blade coater method, and the glass paste was dried by maintaining at 90° C. for 30 minutes. This was followed by baking at a temperature 10° C. above the softening point for 10 minutes, so as to form the dielectric layer.

Reflected colors were measured using a color difference meter on the back side (the side with no electrodes) of the substrate formed as above. Measurements were made with natural light, and colors were corrected with a reference white board.

The measurement results are shown in Table 4. In Table 4, "a*" and "b*" are based on the L*a*b* color system. The value of "a*" that increases in the plus direction denotes stronger red, while the value of "a*" that increases in the minus direction denotes stronger green. On the other hand, the value of "b*" that increases in the plus direction denotes stronger yellow, while the value of "b*" that increases in the minus direction denotes stronger blue. Generally, when the a* value is in the range of −5 to +5 and the b* value also is in the range of −5 to +5, no coloring of the panel is observed. Therefore, the values of a* and b* should preferably fall in these ranges. Even with the b* value above +5, a proper hue can be restored by adding an element that can cancel the stained color, or with the use of a color filter. That is, the b* value does not pose problems as long as it can be corrected by some means (though lower B* values are preferable). Preferably, the b* value is no greater than +5.

TABLE 4

| Sample | Composition Ratio (Atomic %) | | | Properties | | | | | |
|---|---|---|---|---|---|---|---|---|---|
| No. | B | Mo | W | Tg | Ts | α | ε | a* | b* |
| 101 | 67.0 | 0 | 0 | 482 | 583 | 79 | 6.1 | −2.1 | 20.4 |
| 102 | 68.95 | 0.05 | 0 | 482 | 583 | 79 | 6.1 | −2.1 | 9.5 |
| 103 | 68.9 | 0.1 | 0 | 482 | 583 | 79 | 6.1 | −2.1 | 4.8 |
| 104 | 68.5 | 0.5 | 0 | 481 | 582 | 79 | 6.1 | −2.1 | 4.0 |
| 105 | 68 | 1 | 0 | 480 | 581 | 79 | 6.1 | −2.1 | 3.3 |
| 106 | 67 | 2 | 0 | 480 | 580 | 80 | 6.2 | −2.2 | 3.8 |
| 107 | 66 | 3 | 0 | 479 | 578 | 80 | 6.3 | −2.2 | 4.9 |
| 108 | 64 | 5 | 0 | 477 | 575 | 81 | 6.5 | −2.2 | 7.6 |
| 109 | 68.95 | 0 | 0.05 | 482 | 583 | 79 | 6.1 | −2.1 | 11.2 |
| 110 | 68.9 | 0 | 0.1 | 482 | 583 | 79 | 6.1 | −2.1 | 4.9 |
| 111 | 68.5 | 0 | 0.5 | 482 | 583 | 79 | 6.1 | −2.1 | 4.2 |
| 112 | 68 | 0 | 1 | 482 | 583 | 79 | 6.1 | −2.2 | 3.6 |
| 113 | 67 | 0 | 2 | 481 | 580 | 80 | 6.2 | −2.2 | 4.1 |
| 114 | 66 | 0 | 3 | 480 | 578 | 80 | 6.3 | −2.2 | 5.0 |
| 115 | 64 | 0 | 5 | 478 | 576 | 82 | 6.5 | −2.2 | 8.3 |
| 116 | 68.9 | 0.05 | 0.05 | 482 | 581 | 79 | 6.1 | −2.1 | 4.8 |
| 117 | 68 | 1 | 1 | 480 | 579 | 79 | 6.2 | −2.1 | 3.7 |
| 118 | 64 | 3 | 2 | 475 | 574 | 81 | 6.5 | −2.2 | 8.8 |

As clearly shown in Table 4, the b* value became smaller with increasing amounts of $MoO_3$ or $WO_3$ (atomic percentages of Mo or W). When the amount of $MoO_3$ or $WO_3$ was 0.1 atomic % or greater, the b* value fell in the range of 5 or less and yellowing was prevented. The b* value increased with further increase in the amount of $MoO_3$ or $WO_3$, and was above 5 at 5 atomic %. Conceivably, this is due to the color imparted to the glass by the $MoO_3$ or $WO_3$ itself, even though yellowing due to the deposition of Ag colloids is suppressed. It is therefore preferable that $MoO_3$ or $WO_3$ be added in the amount of 0.1 atomic % or greater and no greater than 3 atomic %.

The inventors of the present invention also examined the effect of adding $MoO_3$ or $WO_3$ in samples in which the base glass had other main composition percentages. As a result, the addition of $MoO_3$ or $WO_3$ was found to prevent yellowing also in compositions within the composition ranges of the present invention.

Example 5

In Example 5, a PDP was made that had a configuration similar to the PDP shown in FIG. 1.

According to the methods of Example 1, powders of raw materials were mixed together in the atomic ratio of B:Si:Zn:K:Ca=65.5:10:10:13:1.5. The mixture of raw materials was placed in a platinum crucible and melted in an electric furnace at 1150° C. for two hours. Thereafter, glass cullet was formed by a twin-roller method, and the glass cullet was crushed with a dry ball mill to obtain a powder thereof. The glass powder so obtained had an average particle diameter of about 2 μm. This glass had a relative dielectric constant of 6.2, a glass transition temperature of 486° C., a softening point of 580° C., and a thermal expansion coefficient of $77 \times 10^{-7}/°$ C.

To the powder were added ethyl cellulose, used as a binder, and α-terpineol, used as a solvent. The whole was mixed together with three rollers to prepare a glass paste.

A material of ITO (transparent electrodes) was applied in a predetermined pattern onto the surface of a front glass substrate formed of flat soda lime glass of about 2.8 mm thick and then was dried. Subsequently, a silver paste that was a mixture of silver powder and an organic vehicle was applied in the form of a plurality of lines. Thereafter, this front glass substrate was heated to bake the silver paste and thereby form display electrodes.

The glass paste was applied by the blade coater method to the front glass substrate on which the display electrodes had been formed. Thereafter, the front glass substrate was kept at 90° C. for 30 minutes to dry the glass paste. This then was baked at a temperature of 585° C. for 10 minutes to form a dielectric layer having a thickness of about 20 μm.

Magnesium oxide (MgO) was deposited on the dielectric layer by the electron-beam vapor deposition method, followed by baking at 500° C. to form a protective layer.

The front panel was made by the method described above.

The back panel was produced by the following method. First, by screen printing, address electrodes containing silver as a main component were formed into stripes on a back glass substrate made of soda lime glass. Subsequently, a dielectric layer having a thickness of about 40 μm was formed according to the method used to form the front panel.

Next, barrier ribs were formed on the dielectric layer between adjacent address electrodes. The barrier ribs were formed through a repetition of the screen printing and baking.

Next, phosphor pastes of red (R), green (G), and blue (B) were applied to the side surfaces of the barrier ribs and the surface of the dielectric layer that was exposed between the barrier ribs. The phosphor layers were then dried and baked to form phosphor layers. As the phosphors, the materials mentioned above were used.

The front panel and the back panel thus produced were bonded to each other at 500° C. with Bi—Zn—B—Si—O sealing glass. Thereafter, the discharge spaces were evacuated to a high vacuum (approximately $1 \times 10^{-4}$ Pa) and then were charged with Ne—Xe discharge gas so as to have a predetermined pressure. As a result, a PDP was produced.

It was confirmed that this panel had no particular defects in the dielectric layer and operated without any problems.

Example 6

In Example 6, a PDP with the dielectric layer of a two-layer structure as shown in FIG. 3 was produced.

For the second dielectric layer, a B—Si—Zn—K—Ca—O glass paste was prepared as in Example 5. Separately, a Bi—Zn—B—Ca—Si—O glass paste was prepared for the first dielectric layer. This glass paste for the first dielectric layer contained Bi and was substantially free from alkali metal, and had a relative dielectric constant of 11, and a softening point of 585° C.

With these pastes, a PDP panel was produced in which the dielectric layer for the front panel had a two-layer structure, according to the same methods as in Example 5. The two-layer structure included the first dielectric layer that directly covered the electrodes, and the second dielectric layer formed on the first dielectric layer. The first dielectric layer was baked at 590° C. in a thickness of about 20 μm. The second dielectric layer was baked at 580° C. in a thickness of about 20 μm.

It was confirmed that this panel had no particular defects in the dielectric layer and operated without any problems.

Example 7

According to the methods of Example 1, powders of raw materials were mixed together in the atomic ratio of B:Si:Zn:K:Li:Ca=70:10:3:10.5:3:3.5. The mixture of raw materials was placed in a platinum crucible and melted in an electric furnace at 1150° C. for two hours. Thereafter, glass cullet was produced by a twin-roller method, and the glass cullet was crushed with a dry ball mill to obtain a powder thereof. The glass powder so obtained had an average particle diameter of about 2 μm. This glass had a relative dielectric constant of 5.9, a glass transition temperature of 480° C., a softening point of 580° C., and a thermal expansion coefficient of $78 \times 10^{-7}/°$ C.

With the glass powder, a PDP was produced according to the same methods as in Example 5. It was confirmed that this panel had no particular defects in the dielectric layer and operated without any problems.

Example 8

In Example 6, a PDP with the dielectric layer of a two-layer structure as shown in FIG. 3 was produced.

For the second dielectric layer, a B—Si—Zn—K—Li—Ca—O glass paste was prepared as in Example 7. Separately, a Bi—Zn—B—Ca—Si—O glass paste was prepared for the first dielectric layer. This glass paste for the first dielectric layer contained Bi and was substantially free from alkali metal, and had a relative dielectric constant of 11, and a softening point of 585° C.

With these pastes, a PDP panel was produced in which the dielectric layer for the front panel had a two-layer structure, according to the same methods as in Example 6. The two-layer structure included the first dielectric layer that directly covered the electrodes, and the second dielectric layer formed on the first dielectric layer. The first dielectric layer was baked at 590° C. in a thickness of about 20 μm. The second dielectric layer was baked at 580° C. in a thickness of about 20 μm.

It was confirmed that the resulting panel had no particular defects in the dielectric layer and operated without any problems.

INDUSTRIAL APPLICABILITY

A glass composition of the present invention can be suitably used for the formation of insulating and covering glass for electrodes, particularly the dielectric layer that covers display electrodes or address electrodes of plasma display panels.

The invention claimed is:

1. A glass composition which is oxide glass wherein percentages of constituting elements excluding oxygen (O) are 56 atomic % to 72 atomic % boron (B), 0 atomic % to 15 atomic % silicon (Si), 0 atomic % to 7 atomic % zinc (Zn), 8 atomic % to 20 atomic % potassium (K), and 12 atomic % to 20 atomic % a total amount of potassium (K), sodium (Na), and lithium (Li), all inclusive, wherein the glass composition has a relative dielectric constant of 6 or less.

2. The glass composition according to claim 1, which further comprises at least one selected from magnesium (Mg), calcium (Ca), strontium (Sr), and barium (Ba), wherein a total amount of magnesium (Mg), calcium (Ca), strontium (Sr), and barium (Ba) is greater than 0 atomic % and no greater than 5 atomic % in terms of the percentages of constituting elements excluding oxygen (O).

3. The glass composition according to claim 1, wherein the total amount of potassium (K), sodium (Na), and lithium (Li) is no greater than 15 atomic % in terms of the percentages of constituting elements excluding oxygen (O).

4. The glass composition according to claim 1, which further comprises at least one selected from molybdenum (Mo) and tungsten (W), wherein a total amount of molybdenum (Mo) and tungsten (W) is greater than 0 atomic % and no greater than 3 atomic % in terms of the percentages of constituting elements excluding oxygen (O).

5. The glass composition according to claim 1, which has a softening point of no greater than 595° C., a glass transition temperature of 465° C. or greater, a thermal expansion coefficient of $70 \times 10^{-7}$ to $90 \times 10^{-7}/°$ C. inclusive.

6. A display panel including a dielectric layer that contains the glass composition of claim 1 and covers an electrode.

7. The display panel according to claim 6, wherein the dielectric layer includes a first dielectric layer that directly covers the electrode, and a second dielectric layer disposed on the first dielectric layer, and wherein the first dielectric layer contains a glass composition that is substantially free from alkali metal elements, and the second dielectric layer contains the glass composition as claimed in claim 7.

8. The display panel according to claim 6, wherein the electrode contains at least one selected from silver (Ag) and copper (Cu).

9. A plasma display panel, comprising:
a front panel provided with a first electrode;
a back panel provided with a second electrode crossing the first electrode, and disposed face to face with the front panel;
a dielectric layer for covering at least one selected from the first electrode and the second electrode; and
barrier ribs disposed between the front panel and the back panel to form discharge spaces,
wherein at least one selected from the dielectric layer and the barrier ribs includes the glass composition of claim 1.

10. The display panel according to claim 9, wherein the electrode covered with the dielectric layer contains at least one selected from silver (Ag) and copper (Cu).

11. A display panel including a first dielectric layer disposed on a substrate, an electrode disposed on the first dielectric layer, and a second dielectric layer disposed on the electrode,
wherein the first dielectric layer includes the glass composition of claim 1.

12. The display panel according to claim 11, wherein the electrode contains at least one selected from silver (Ag) and copper (Cu).

* * * * *

UNITED STATES PATENT AND TRADEMARK OFFICE
CERTIFICATE OF CORRECTION

PATENT NO. : 7,847,483 B2
APPLICATION NO. : 12/066149
DATED : December 7, 2010
INVENTOR(S) : Inoue et al.

It is certified that error appears in the above-identified patent and that said Letters Patent is hereby corrected as shown below:

Column 22, line 8 (claim 7): "as claimed in claim 7" should read --as claimed in claim 1--.

Signed and Sealed this
Thirty-first Day of May, 2011

David J. Kappos
*Director of the United States Patent and Trademark Office*